United States Patent
Mehlan et al.

(10) Patent No.: US 6,976,921 B2
(45) Date of Patent: Dec. 20, 2005

(54) COUPLING

(75) Inventors: Andreas Mehlan, Unna (DE); Jürgen Walter, Haltern (DE)

(73) Assignee: Hackforth GmbH, Herne (DE)

( * ) Notice: Subject to any disclaimer, the term of this patent is extended or adjusted under 35 U.S.C. 154(b) by 136 days.

(21) Appl. No.: 10/415,859

(22) PCT Filed: Nov. 2, 2001

(86) PCT No.: PCT/EP01/12738

§ 371 (c)(1),
(2), (4) Date: May 2, 2003

(87) PCT Pub. No.: WO02/44577

PCT Pub. Date: Jun. 6, 2002

(65) Prior Publication Data

US 2004/0050199 A1 Mar. 18, 2004

(30) Foreign Application Priority Data

Nov. 3, 2000 (DE) .......................... 200 18 823

(51) Int. Cl.[7] ................................. F16D 3/52
(52) U.S. Cl. ............... 464/89; 464/75; 74/434
(58) Field of Search .............. 464/88, 89, 90, 464/75; 264/251, 255; 74/439, 446, 434

(56) References Cited

U.S. PATENT DOCUMENTS

| | | | | |
|---|---|---|---|---|
| 1,435,141 A | * | 11/1922 | Serrell ........................ | 464/88 |
| 1,906,057 A | | 4/1933 | Guy | |
| 3,272,027 A | * | 9/1966 | Wayman ..................... | 74/434 |
| 3,469,467 A | * | 9/1969 | Seaman ....................... | 74/439 |
| 3,469,468 A | * | 9/1969 | Cozzarin et al. ............. | 74/439 |
| 3,730,009 A | * | 5/1973 | Mead et al. .................. | 74/439 |
| 3,733,921 A | * | 5/1973 | Carveth ....................... | 74/439 |
| 4,946,427 A | * | 8/1990 | Rampe ........................ | 74/439 |
| 5,098,346 A | * | 3/1992 | Redmond .................... | 74/439 |

FOREIGN PATENT DOCUMENTS

| | | | | |
|---|---|---|---|---|
| AU | 465084 | * | 9/1975 | ................. 464/90 |
| DE | 28 34490 A | | 2/1980 | |
| DE | 196 19 434 A | | 11/1997 | |
| EP | 0 740 077 A | | 10/1996 | |
| GB | 2 101 709 A | | 1/1983 | |
| GB | 897 771 A | | 5/1992 | |

* cited by examiner

*Primary Examiner*—Aaron Dunwoody
(74) *Attorney, Agent, or Firm*—Collard & Roe, P.C.

(57) ABSTRACT

The invention relates to a rotationally symmetrical coupling comprising an annular hub made of a rigid material, which is surrounded by an outer ring made of a rubber-elastic material. The coupling also comprises an outer contouring, which is located on the outer diameter and which is provided for positively transmitting torques, whereby the outer ring is reinforced by an embedded, annular, rigid solid body. The aim of the invention is to achieve a quieter operation of a coupling of the aforementioned type and to better protect this coupling from becoming damaged. To these ends, the invention provides that the rubber-elastic material is silicone and that the annular, rigid solid body, on the outside, has a shape, which is similar to that of the outer contouring of the outer ring and which maintains, over the circumference, a nearly constant distance from the outer contouring of the outer ring. The rigid solid body is preferably comprised of a curved, metallic strip material having a constant thickness.

4 Claims, 5 Drawing Sheets

COUPLING

CROSS REFERENCE TO RELATED APPLICATIONS

Applicants claim priority under 35 U.S.C. §119 of German Application No. 200 18 823.2 filed Nov. 3, 2000. Applicants also claim priority under 35 U.S.C. §365 of PCT/EP01/12738 filed Nov. 2, 2001. The international application under PCT article 21(2) was not published in English.

BACKGROUND OF THE INVENTION

1. Field of the Invention

The invention relates to a rotationally symmetrical coupling comprising an annular hub that is made of a substantially rigid material and surrounded by an outer ring made of a rubber-elastic material, as well as an outer contouring that is located on the outer diameter and is provided for positively transmitting torques, whereby a substantially ring-shaped, rigid solid body is embedded in the rubber-elastic material of the outer ring near the outer contouring. Said solid body has an outer contouring as well, whereby individual shaped elements of the outer contouring of the ring-shaped, rigid solid body protrude radially from the inside outwards into individual shaped elements of the outer contouring.

2. The Prior Art

In connection with a coupling of the type specified above that is known in the prior art, the embedded solid body consists of a rigid metallic ring, to which a radial protrusion is welded as well to each site where the outer ring made of rubber-elastic material has a radial protrusion. In that connection, the layer of rubber-elastic material covering the metallic ring is very thin in each of the areas of the protrusions and in each center between two projections, but otherwise very thick. The consequence thereof is that the elastic properties at each of the points along the circumference of the outer ring where the load in introduced are very uneven, which may lead to a rough operation of the coupling and to damage of the outer contouring. Such damage is particularly critical if such damage leads to any direct contact between the embedded solid body and machine elements located downstream, or to contact with aggressive media.

SUMMARY OF THE INVENTION

Therefore, an object of the invention is to further develop the coupling of the type specified above in that it will run operate in a quieter manner and be protected against damage in a superior way.

For achieving this object, provision is made according to the invention based on a coupling of the type specified above that the material with the elasticity of rubber is silicone, and that the outwardly pointing shape of the ring-shaped, rigid solid body is similar to the outer contouring of the outer ring and has a nearly constant distance from the outer contouring of the outer ring over the circumference. In this way, the elastic properties of the coupling in each of the sites where the load is introduced are always identical, and it is ensured that no local load concentrations will occur in the silicone material. The probability of notches developing in the elastic outer ring is reduced by using silicone material. Furthermore, the ring-shaped, rigid solid body is completely covered outwards by the chemically highly resistant silicone layer.

According to a particularly preferred embodiment of the invention, provision is made that the ring-shaped, rigid solid body consists of curved metallic strip material having a constant thickness. Such an embodiment of the ring-shaped solid body is particularly favorable in terms of costs. Furthermore, the required rigidity of the reinforcing solid body can be determined in a particularly simple manner by the thickness of the strip material used. For example, the rigid, ring-shaped solid body can be dimensioned taking into account compatible rigidity jumps.

Furthermore, provision is made that the ring-shaped, rigid solid body is made of aluminum or an aluminum alloy. Aluminum strip material can be processed in a particularly simple manner to the rigid ring employed according to the invention; it has a low specific weight and it is bonding with the adjacent silicone material in an excellent way.

Finally, provision is made that the rigid solid body is completely surrounded by a layer of silicone material. A particularly good support of the solid body is ensured by completely embedding the rigid solid body in aluminum. In addition, the rigid solid body is well-protected all around against any access of aggressive media.

BRIEF DESCRIPTION OF THE DRAWINGS

The invention is explained in the following in greater detail with the help of a special exemplified embodiment and by reference to various drawings. The following is shown in the drawings.

DETAILED DESCRIPTION OF PREFERRED EMBODIMENTS

Figure 1:
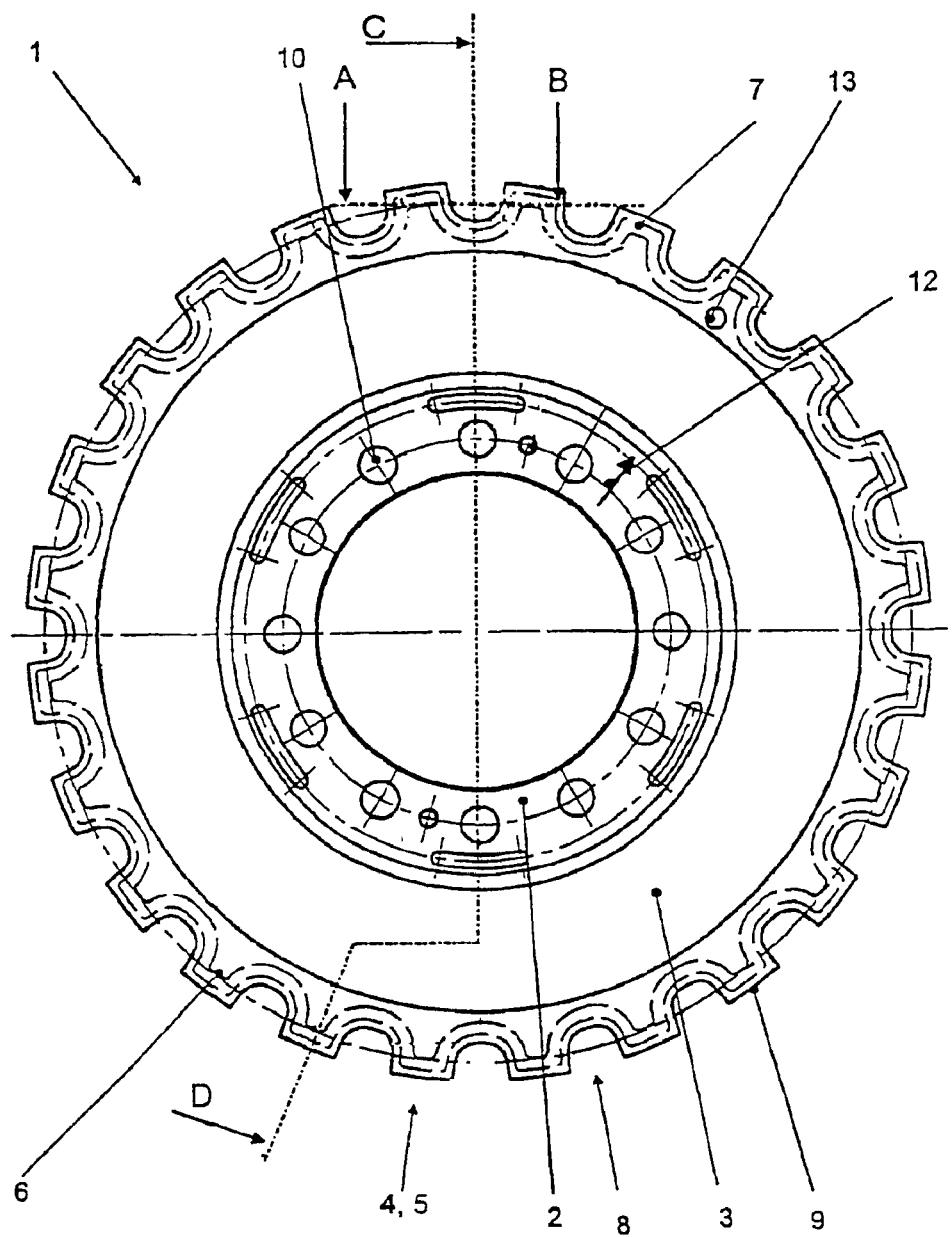
FIG. 1 is a side view of a coupling as defined by the invention.
Figure 2:
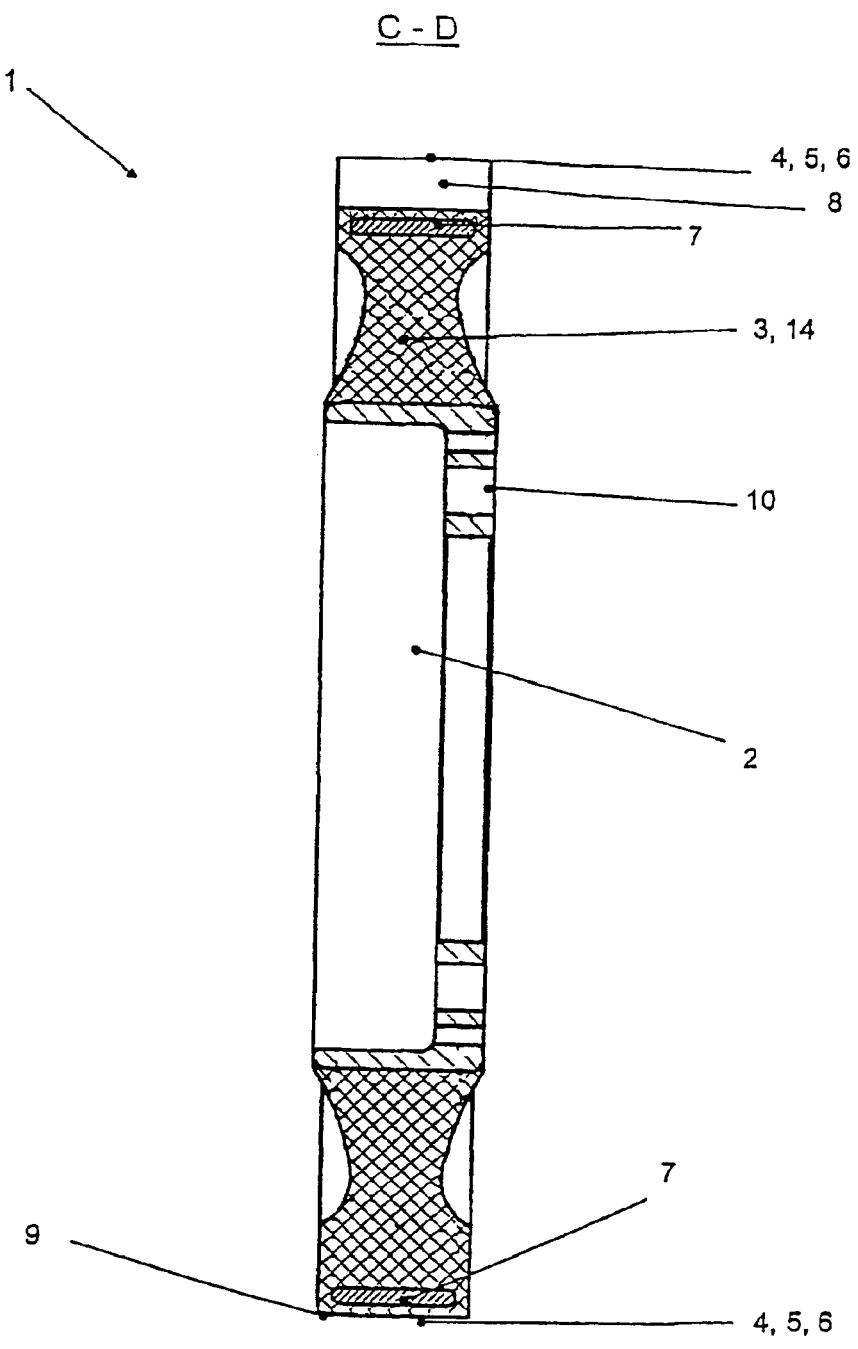
FIG. 2 is a section through a coupling as defined by the invention according to section C-D in FIG. 1.
Figure 3:
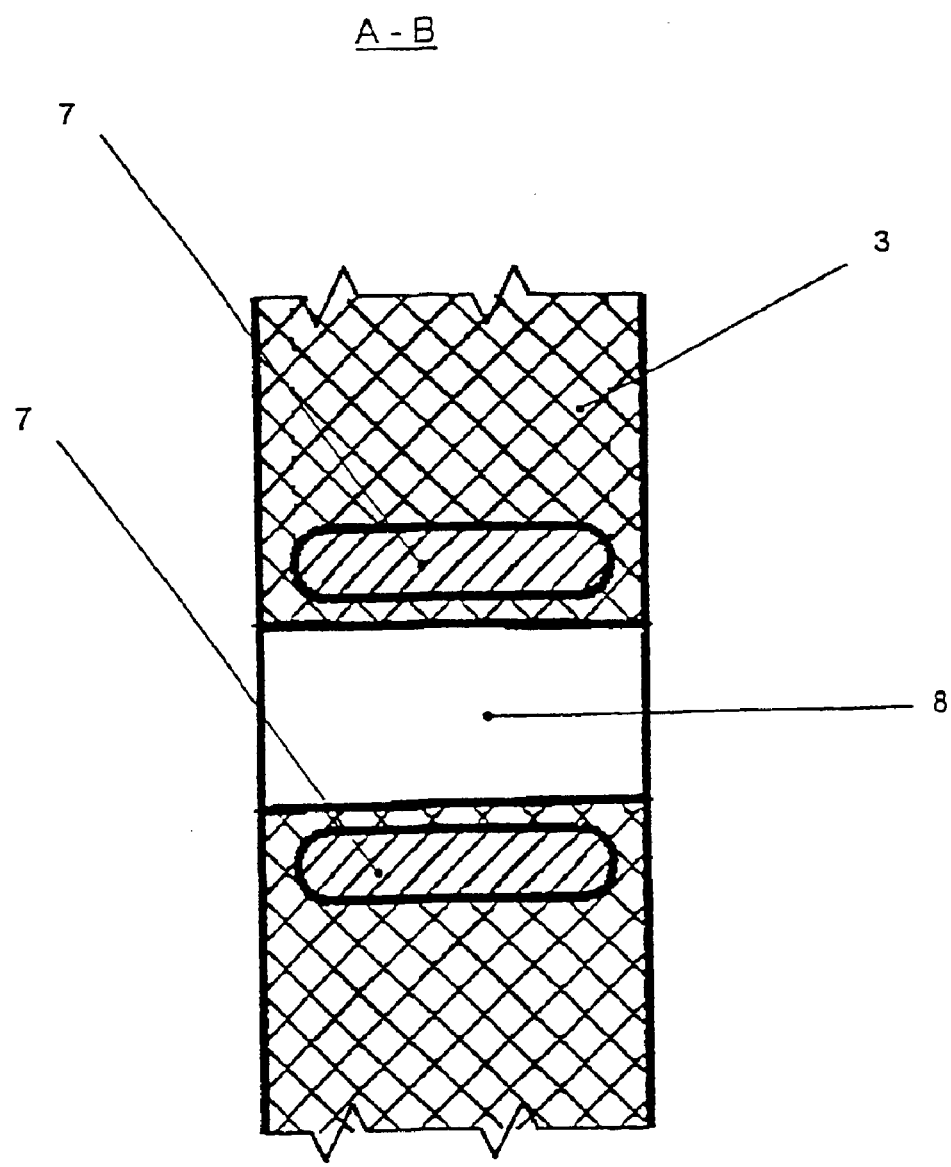
FIG. 3 is a section through a coupling as defined by the invention according to section A-B shown in FIG. 1.
Figure 4:
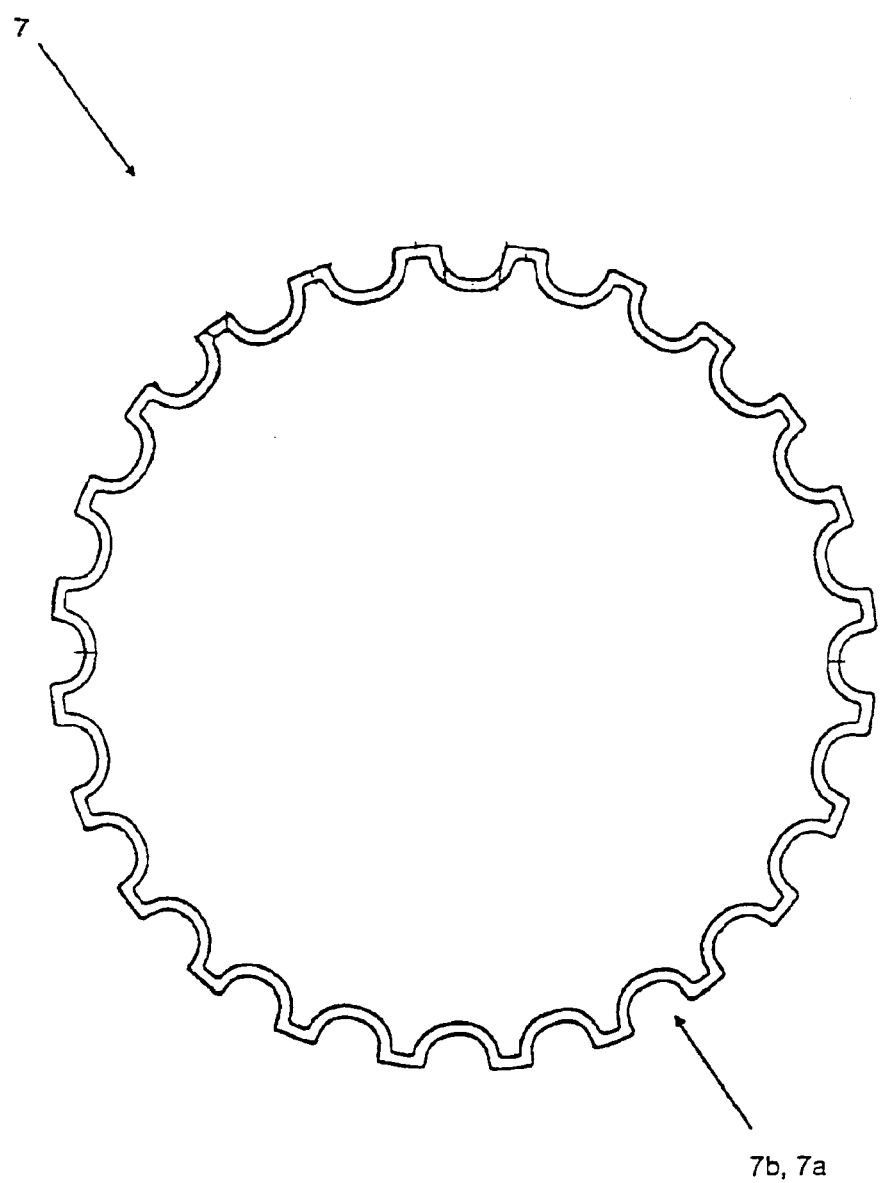
FIG. 4 shows a ring-shaped, rigid solid body as defined by the invention.
Figure 5:
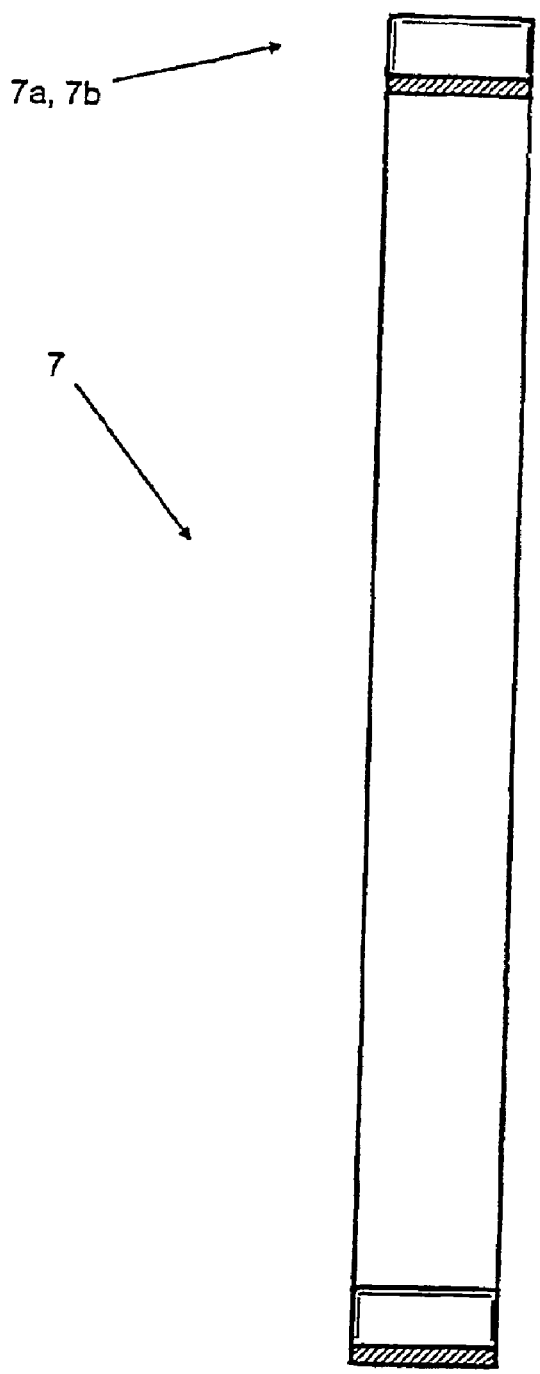
FIG. 5 is a section through the rigid solid body as defined by the invention in FIG. 4 according to section E-F shown in FIG. 4.

FIG. 1 shows a coupling 1 as defined by the invention that is comprised of a metallic hub 2 and an elastic outer ring 3 made of silicone, which adjoins said hub radially on the outside. On its outside diameter 4, the outer ring 3 has an outer contouring 5, via which it is transmitting the torque introduced via the hub 2 to machine elements located downstream.

For supporting the individual shaped elements 6 of the outer contouring 5 of the outer ring 3, a ring-shaped, rigid solid body 7 made of aluminum strip having a uniform thickness is embedded in the silicone material of the outer ring 3. Like the outer ring 3, the ring-shaped, rigid solid body 7 is provided with an outer contouring 7a formed from semicircular shaped elements 7b or molded cavities 8. The ring-shaped, rigid solid body 7 is completely surrounded by the silicone material, so that radially outwards, a uniformly thick layer 9 of silicone material is obtained around the ring-shaped, rigid solid body 7.

The introduction of force from the shaft not shown into the hub 2 takes place via the axial bores 10. Centering bores ensure a defined position of the coupling 1 in relation to the shaft not shown. The markings 12 and 13 are provided on the hub 2 and the outer ring 3, respectively, Any peripheral offset of the markings 12 and 13 indicates a plastic deformation of the outer ring 3.

In accordance with the specific load of the outer ring 3, which decreases as the radius increases, the cross section 14 of the outer ring 3 is tapering as the diameter increases. For receiving the ring-shaped, rigid solid body 7, the cross section 14 is widening again in such a manner that the ring-shaped, rigid solid body 7 is completely surrounded by the silicone material of the outer ring.

What is claimed is:

1. A rotationally symmetrical coupling (1) comprising an annular hub (2) made of a substantially rigid material and surrounded by an outer ring (3) made of a rubber-elastic material, as well as an outer contouring (5) located on the outside diameter (4) for positively transmitting torques, whereby in the outer ring (3) adjacent to its outer contouring (5), a substantially ring-shaped, rigid solid body (7) is embedded in the rubber-elastic material of the outer ring (3), the latter having an outer contouring (7*a*) as well; and whereby individual, shaped elements (7*b*) of the outer contouring (7*a*) of the ring-shaped, rigid solid body radially project into individual, shaped elements (6) of the outer contouring (5) of the outer ring (3) from the inside outwards, wherein the rubber-elastic material is silicone, and that the outer contouring (7*a*) of the ring-shaved, rigid solid body (7) forms a parallel contour to the outer contouring (5) of the outer ring (3) running in a constant distance from the outer ring (3) over the circumference.

2. The coupling according to claim 1, wherein the ring-shaped, rigid solid body (7) consists of curved, metallic strip material having a constant thickness.

3. The coupling according to claim 1, wherein the ring-shaped, rigid solid body (7) consists of aluminum or an aluminum alloy.

4. The coupling according to claim 1, wherein the ring-shaped, rigid solid body (7) is completely surrounded by a layer of silicone material.

* * * * *